US010655470B2

(12) United States Patent
Okabe et al.

(10) Patent No.: US 10,655,470 B2
(45) Date of Patent: May 19, 2020

(54) IMPELLER AND ROTARY MACHINE

(71) Applicant: MITSUBISHI HEAVY INDUSTRIES, LTD., Tokyo (JP)

(72) Inventors: Ryoji Okabe, Tokyo (JP); Yasunori Watanabe, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 237 days.

(21) Appl. No.: 15/521,424

(22) PCT Filed: Oct. 7, 2015

(86) PCT No.: PCT/JP2015/078481
§ 371 (c)(1),
(2) Date: Apr. 24, 2017

(87) PCT Pub. No.: WO2016/084490
PCT Pub. Date: Jun. 2, 2016

(65) Prior Publication Data
US 2017/0306761 A1 Oct. 26, 2017

(30) Foreign Application Priority Data
Nov. 25, 2014 (JP) ................. 2014-237694

(51) Int. Cl.
F01D 5/04 (2006.01)
F02B 39/00 (2006.01)
(Continued)

(52) U.S. Cl.
CPC .............. F01D 5/048 (2013.01); F01D 5/04 (2013.01); F02B 39/00 (2013.01); F02C 6/12 (2013.01);
(Continued)

(58) Field of Classification Search
CPC .......... F01D 5/048; F01D 5/04; F04D 29/023; F04D 29/284; F04D 29/266; F04D 17/10;
(Continued)

(56) References Cited

U.S. PATENT DOCUMENTS 1,535,417 A * 4/1925 Huff ...................... F04D 29/281
416/219 R
2,799,445 A * 7/1957 Hull ........................ F01D 5/025
416/188
(Continued)

FOREIGN PATENT DOCUMENTS

CN 102933855 A 2/2013
DE 4427115 C1 * 4/1995 ........... F04D 29/281
(Continued)

OTHER PUBLICATIONS

International Search Report and Written Opinion of the International Searching Authority (Forms PCT/ISA/237 and PCT/ISA/210) for International Application No. PCT/JP2015/078481, dated Dec. 28, 2015, with English translations.

Primary Examiner — Sizo B Vilakazi
Assistant Examiner — Brian R Kirby
(74) Attorney, Agent, or Firm — Birch, Stewart, Kolasch & Birch, LLP

(57) ABSTRACT

This impeller is provided with: an impeller body formed in a disk-like shape and having a boss hole section formed therein, the boss hole section allowing a rotating shaft to be fitted therein; and compressor blades provided on the front surface side of the impeller body so as to protrude from the hub surface of the impeller body. The impeller consists either of a first resin member and a second resin member, which are engaged with each other and which consist of a resin, or of a resin member and a metallic member, which are engaged with each other.

6 Claims, 5 Drawing Sheets

(51) Int. Cl.
*F04D 29/02* (2006.01)
*F02C 6/12* (2006.01)
*F04D 17/10* (2006.01)
*F04D 29/26* (2006.01)
*F04D 29/28* (2006.01)

(52) U.S. Cl.
CPC ........... *F04D 17/10* (2013.01); *F04D 29/023* (2013.01); *F04D 29/266* (2013.01); *F04D 29/284* (2013.01); *F02M 2700/331* (2013.01)

(58) Field of Classification Search
CPC . F04D 29/28; F02C 6/12; F02B 39/00; F02M 2700/331
USPC ...................................................... 416/219 R
See application file for complete search history.

(56) References Cited

U.S. PATENT DOCUMENTS

| | | | | |
|---|---|---|---|---|
| 2,954,739 A * | 10/1960 | Lung | | F04D 13/10 415/140 |
| 4,720,242 A * | 1/1988 | Lovisetto | | F04D 29/2222 415/140 |
| 4,787,821 A * | 11/1988 | Cruse | | B23K 20/021 228/118 |
| 4,850,802 A * | 7/1989 | Pankratz | | F01D 5/02 416/213 R |
| 5,632,601 A | 5/1997 | Bodmer et al. | | |
| 6,712,583 B2 * | 3/2004 | Ijima | | F04D 29/2227 416/185 |
| 8,231,342 B2 * | 7/2012 | Lacey | | F04D 1/06 415/100 |
| 2004/0083609 A1 * | 5/2004 | Malott | | F04D 29/023 29/889.3 |
| 2013/0039750 A1 | 2/2013 | Osuka et al. | | |
| 2013/0149125 A1 | 6/2013 | Onishi et al. | | |
| 2014/0105749 A1 * | 4/2014 | Pellenc | | F04D 29/023 416/210 R |
| 2014/0328689 A1 * | 11/2014 | Ishikawa | | F04D 29/285 416/223 R |
| 2014/0341715 A1 * | 11/2014 | Baehmann | | F01D 5/048 415/122.1 |
| 2015/0030457 A1 * | 1/2015 | Yamamoto | | F04D 29/023 416/234 |

FOREIGN PATENT DOCUMENTS

| | | | | |
|---|---|---|---|---|
| DE | 102007055614 A1 * | 5/2009 | ........... | F04D 29/285 |
| GB | 1173834 A | 12/1969 | | |
| JP | 49-1041 Y | 1/1974 | | |
| JP | 51-38111 A | 3/1976 | | |
| JP | 55-57698 A | 4/1980 | | |
| JP | 62-101007 U | 6/1987 | | |
| JP | 62-114103 U | 7/1987 | | |
| JP | 3-10040 U | 1/1991 | | |
| JP | H03010040 | * | 1/1991 | |
| JP | 3-267599 A | 11/1991 | | |
| JP | 6-93871 A | 4/1994 | | |
| JP | H06-93871 A | * | 5/1994 | |
| JP | 11-22696 A | 1/1999 | | |
| JP | 11-210687 A | 8/1999 | | |
| JP | 2000-179493 A | 6/2000 | | |
| JP | 2000213493 A | * | 8/2000 | |
| JP | 2007-278193 A | 10/2007 | | |
| JP | 2012-219619 A | 11/2012 | | |
| JP | 2014-237301 A | 12/2014 | | |
| WO | WO 2012/057309 A1 | 5/2012 | | |

* cited by examiner

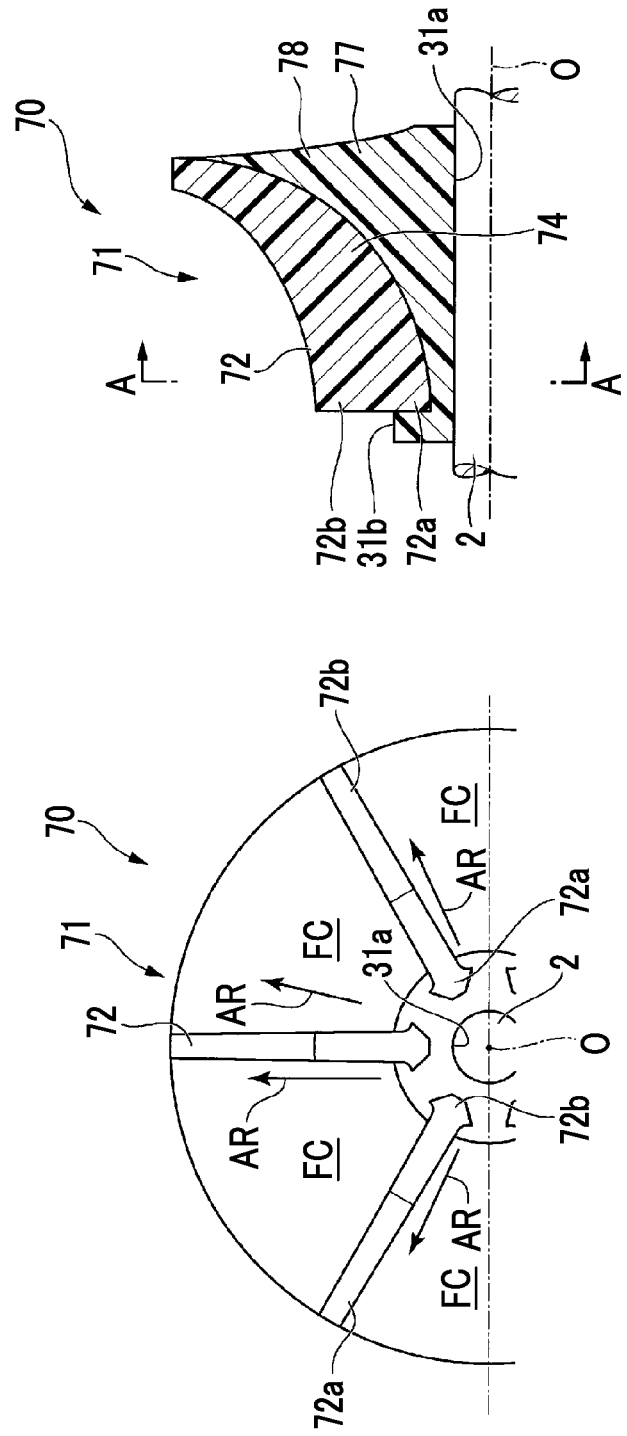

IMPELLER AND ROTARY MACHINE

TECHNICAL FIELD

The invention relates to an impeller provided in a rotary machine, and a rotary machine including an impeller.

Priority is claimed on Japanese Patent Application No. 2014-237694, filed Nov. 25, 2014, the content of which is incorporated herein by reference.

BACKGROUND ART

While the global efforts of earth environment preservation proceed, intensification of regulations regarding exhaust gas or fuel efficiency in internal combustion engines, such as engines of automobiles is under way. Turbochargers are rotary machines that can enhance effects of fuel efficiency improvement and $CO_2$ reduction by sending compressed air into an engine to combust fuel compared to natural intake engines.

In the turbochargers, a turbine is rotationally driven with exhaust gas of an engine, thereby rotating an impeller of a centrifugal compressor. The air compressed by the rotation of the impeller is raised in pressure by being reduced in speed by a diffuser, and is supplied to the engine through a scroll flow passage. In addition, as methods for driving the turbochargers, not only methods of being driven with exhaust gas but also, for example, methods using electric motors, methods using prime movers, and the like are known.

As an impeller of a turbocharger, an impeller using a complex material (hereinafter referred to as a resin) of synthetic resins, such as carbon fiber reinforced plastic, is known as described in, for example, PTL 1. Here, such a resin impeller has low rigidity compared to a metallic impeller, and if the resin impeller rotates, the amount of deformation thereof becomes large under the influence of a centrifugal force. For this reason, a boss hole into which a rotating shaft is fitted may be increased in diameter, and rotation balance may be impaired.

In view of such a problem, in the impeller described in PTL 1, the deformation of the impeller by the centrifugal force is suppressed by providing a back surface part with a metallic ring.

CITATION LIST

Patent Literature

[PTL 1] Japanese Unexamined Utility Model Registration Application Publication No. 3-10040

SUMMARY OF INVENTION

Technical Problem

As disclosed in PTL 1, since the impeller is formed of the resin in a case where the metallic ring is used, the material of the impeller differ from the material of the ring. Therefore, the metallic ring has a larger coefficient of linear expansion than that of the resin impeller. For this reason, the stress generated in the impeller cannot be distributed to the ring depending on operation conditions, the deformation of the impeller cannot be suppressed, and it is difficult to guarantee the reliability of the impeller.

The invention provides an impeller and a rotary machine that can guarantee reliability even if resin materials are used.

Solution to Problem

According to a first aspect of the invention, an impeller includes an impeller body forming a disk-like shape and having a boss hole section formed therein, a rotating shaft being fitted into the boss hole section; and a plurality of blades provided on a front surface side of the impeller body so as to protrude from a hub surface of the impeller body. The impeller is formed of a plurality of resin members, which are engaged with each other and made of a resin.

According to such an impeller, since the impeller consists of the plurality of resin members, the thickness dimension of each member can be made small. Here, the resin members are molded using a mold. In this case, on the resin member sides contacting the mold, cooling proceeds rapidly compared to insides of the resin members spaced apart from the mold. Thus, thin film-like skin layers are formed. On the other hand, since cooling proceeds gently on the insides of the resin members, core layers are formed. The skin layers have high strength compared to the core layers. According to the first aspect of the invention, since the thickness dimension of each resin member becomes small as described above, the proportion of the skin layer in each resin member can be enlarged. Therefore, the strength of the impeller can be improved. Moreover, since each resin member becomes small, improvement in precision of molding and facilitation of molding can be achieved.

According to a second aspect of the invention, the plurality of resin members in the above first aspect may include a first resin member including a portion on the front surface side of the impeller body, and a second resin member including a portion on a back surface side of the impeller body.

Since the impeller is formed of the two resin members of the first resin member and the second resin member in this way, the proportion of the skin layer in each resin member can be enlarged, and the rigidity of the impeller can be improved.

According to a third aspect of the invention, any one of the first resin member and the second resin member in the above second aspect is formed with a protrusion that protrudes toward the other of the first resin member and the second resin member, and the other of the first resin member and the second resin member is formed with a recess into which the protrusion is fitted.

Since the protrusion and the recess are fitted to each other and the first resin member and the second resin member are engaged with each other, these members can be fixed firmly, and these members can be prevented from falling out during rotation.

According to a fourth aspect of the invention, the plurality of resin members in the above first aspect may include a first resin member including a boss part that has the blades and the boss hole section formed therein, forms a tubular shape, and allows the blades to protrude therefrom to a radial outer side of the rotating shaft, and a second resin member including the hub surface that covers the boss part from an outer peripheral side and allows the blades to protrude therefrom to the front surface side.

A centrifugal force acts on the blades particularly greatly due to the rotation of the impeller. In the fourth aspect of the invention, the first resin member includes the blades and the boss part provided with the blades. Therefore, the boss part can be thinly formed. Additionally, the blades are also thin.

For this reason, the proportion of the skin layer in the first resin member can be enlarged, and the strength can be improved. Additionally, since the second resin member is provided to cover the boss part, a centrifugal force that has acted on each blade can be transmitted to the inside of the second resin member, that is, the second resin member on the radial inner side closer to the rotating shaft, via the boss part. Therefore, the deformation of the first resin member caused by the centrifugal force can be suppressed by the second resin member.

According to a fifth aspect of the invention, the plurality of resin members in the above first aspect may include a first resin member including the blades, and a second resin member including the hub surface that has the boss hole section formed therein, covers a base end part of each of the blades from an outer peripheral side, and allows a tip part of the blade to protrude therefrom to the front surface side.

Since the first resin member including the blades and the second resin member including the hub surface are provided as separate members in this way, the base end part of each of the blades that does not protrude from the hub surface can be disposed closer to the inside of the second resin member, that is, on the radial inner side closer to the rotating shaft. Therefore, a centrifugal force that has acted on each blade can be transmitted from the base end part to the second resin member on the inside of the second resin member, and the deformation of the first resin member caused by the centrifugal force can be suppressed by the second resin member. Moreover, the base end part of each blade can be disposed closer to the inside of the second resin member than the skin layer formed on the hub surface side of the second resin member, and it is possible to transmit the centrifugal force, which acts on the blade, from the base end part to the whole skin layer on the hub surface side. Therefore, the deformation of the first resin member caused by the centrifugal force can be suppressed by the second resin member.

According to a sixth aspect of the invention, an impeller includes an impeller body forming a disk-like shape and having a boss hole section formed therein, a rotating shaft being fitted into the boss hole section; and a plurality of blades provided on a front surface side of the impeller body so as to protrude from a hub surface of the impeller body. This impeller includes a resin member including a boss part that has the blades and the boss hole section formed therein, forms a tubular shape, and allows the blades to protrude therefrom to a radial outer side of the rotating shaft; and a metallic member including the hub surface that is disposed closer to an outer peripheral side than the boss part, is engaged with the resin member, and allows the blades to protrude therefrom to the front surface side.

According to such an impeller, the impeller is formed of the resin member and the metallic member. Thus, the thickness dimension of the resin member can be made small, and the proportion of the skin layer in the resin member can be enlarged. Therefore, the rigidity of the impeller can be improved. Moreover, since the resin member becomes small, improvement in precision of molding and facilitation of molding can be achieved.

Additionally, the resin member includes the blades and the boss part provided with the blades. For this reason, the boss part can be thinly formed. Additionally, since the blade is also thin, the proportion of the skin layer in the resin member can be enlarged, and the strength can be improved. Additionally, since the metallic member is provided to cover the boss part, a centrifugal force that has acted on each blade can be transmitted to the inside of the metallic member, that is, the metallic member on the radial inner side closer to the rotating shaft, via the boss part.

Therefore, the deformation of the resin member caused by the centrifugal force can be suppressed by the metallic member.

According to a seventh aspect of the invention, an impeller includes an impeller body forming a disk-like shape and having a boss hole section formed therein, a rotating shaft being fitted into the boss hole section; and a plurality of blades provided on a front surface side of the impeller body so as to protrude from a hub surface of the impeller body. This impeller includes a resin member including the blades; and a metallic member including the hub surface that is engaged with the resin member, has the boss hole section formed therein, covers a base end part of each of the blades from an outer peripheral side, and allows a tip part of the blade to protrude therefrom to the front surface side.

According to such an impeller, the impeller is formed of the resin member and the metallic member. Accordingly, the thickness dimension of the resin member can be made small, and the proportion of the skin layer in the resin member can be enlarged. Therefore, the rigidity of the impeller can be improved. Moreover, since the resin member becomes small, improvement in precision of molding and facilitation of molding can be achieved.

Additionally, since the resin member including the blades and the metallic member including the hub surface are provided as separate members in this way, the base end part of each of the blades that does not protrude from the hub surface can be disposed closer to the inside of the metallic member, that is, on the radial inner side closer to the rotating shaft. Therefore, a centrifugal force that has acted on each blade can be transmitted from the base end part to the metallic member on the inside of the metallic member, and the deformation of the resin member caused by the centrifugal force can be suppressed by the metallic member.

According to an eighth aspect of the invention, a rotary machine includes the impeller according to any one of the above first to seventh aspects; and a rotating shaft that is attached to the impeller and rotates together with the impeller.

According to such a rotary machine, since the thickness dimension of the resin member becomes small, the proportion of the skin layer in the resin member can be enlarged. Therefore, the rigidity of the impeller can be improved. Moreover, since the resin member becomes small, improvement in precision of molding and facilitation of molding can be achieved.

Advantageous Effects of Invention

According to the above-described impeller and rotary machine, a structure split into a plurality of pieces is provided. Thus, even if resin materials are used, it is possible to guarantee reliability.

BRIEF DESCRIPTION OF DRAWINGS

FIG. 4A illustrates a front view as seen from a direction of an axis. FIG. 4B is a sectional view as seen from a radial outer side of a rotating shaft.

FIGS. 5A and 5B are longitudinal sectional views illustrating a compressor impeller of a turbocharger related to a fourth embodiment of the invention. FIG. 5A illustrates a front view as seen from the direction of the axis. FIG. 5B is a sectional view as seen from the radial outer side of the rotating shaft.

DESCRIPTION OF EMBODIMENTS

[First Embodiment]

Hereinafter, a turbocharger 1 (rotary machine) related to an embodiment of the invention will be described.

Figure 1:
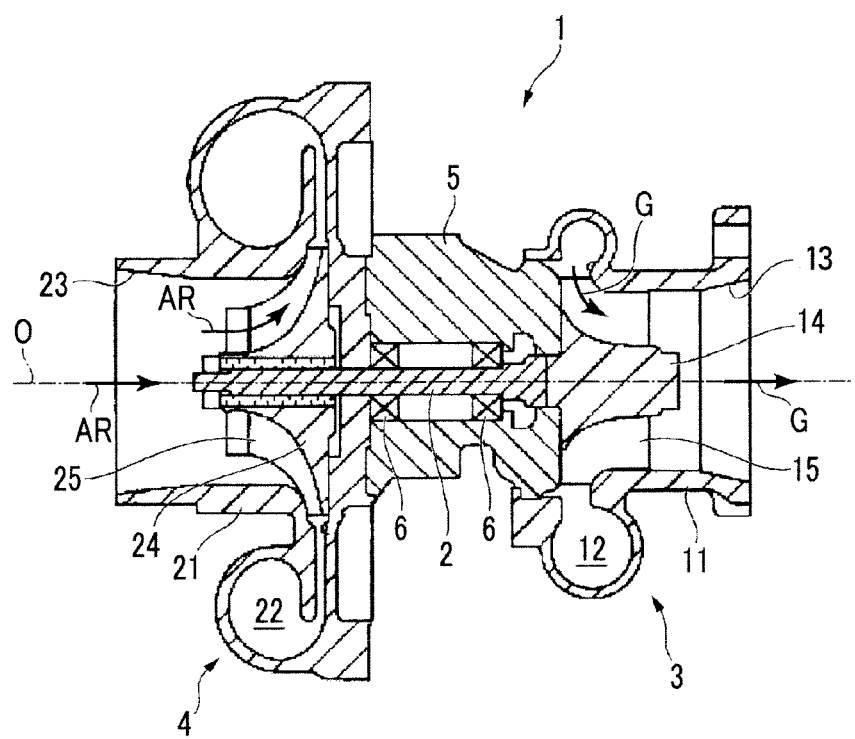
FIG. 1 is a longitudinal sectional view illustrating a turbocharger related to a first embodiment of the invention.

As illustrated in FIG. 1, the turbocharger 1 includes a rotating shaft 2, a turbine 3 and a compressor 4 that rotate together with the rotating shaft 2, and a housing coupling part 5 that couples the turbine 3 and the compressor 4 and supports the rotating shaft 2.

In the turbocharger 1, a turbine 3 is rotated with exhaust gas G from an engine (not illustrated), and air AR compressed by the compressor 4 is supplied to the engine with the rotation.

The rotating shaft 2 extends in a direction of an axis O. The rotating shaft 2 rotates about the axis O.

The turbine 3 is disposed on one side (the right side of FIG. 1) in the direction of the axis O.

The turbine 3 includes a turbine impeller 14 that has the rotating shaft 2 attached thereto and has a turbine blade 15, and a turbine housing 11 that covers the turbine impeller 14 from an outer peripheral side.

The rotating shaft 2 is fitted into the turbine impeller 14. The turbine impeller 14 is rotatable around the axis O together with the rotating shaft 2.

The turbine housing 11 covers the turbine impeller 14. A scroll passage 12, which extending from a leading edge part (an end part on a radial outer side) of the turbine blade 15 toward the radial outer side, is formed in an annular shape centered on the axis O at a position on the radial outer side, and allows the inside and outside of the turbine housing 11 to communicate with each other therethrough, is formed in the turbine housing 11. The turbine impeller 14 and the rotating shaft 2 are rotated by the exhaust gas G being introduced into the turbine impeller 14 from the scroll passage 12.

Additionally, a discharge port 13 opening to one side of the axis O is formed in the turbine housing 11. The exhaust gas G that has passed through the turbine blade 15 flows toward one side of the axis O, and is discharged from the discharge port 13 to the outside of the turbine housing 11.

The compressor 4 is disposed on the other side (the left side of FIG. 1) in the direction of the axis O.

The compressor 4 includes a compressor impeller 24 that has the rotating shaft 2 attached thereto and has a compressor blade 25, and a compressor housing 21 that covers the compressor impeller 24 from the outer peripheral side.

The rotating shaft 2 is fitted into the compressor impeller 24. The compressor impeller 24 is rotatable around the axis O together with the rotating shaft 2.

The compressor housing 21 covers the compressor impeller 24. A suction port 23 opening to the other side of the axis O is formed in the compressor housing 21. The air AR is introduced from the outside of the compressor housing 21 through the suction port 23 into the compressor impeller 24. By a rotative force from the turbine impeller 14 being transmitted to the compressor impeller 24 via the rotating shaft 2, the compressor impeller 24 rotates around the axis O and the air AR is compressed.

A compressor passage 22, which extend from a trailing edge part (a downstream end part of a flow of the air AR) of the compressor blade 25 toward the radial outer side, forms an annular shape centered on the axis O at a position on the radial outer side, and allows the inside and outside of the compressor housing 21 to communicate with each other therethrough, is formed in the compressor housing 21. The air AR compressed by the compressor impeller 24 is introduced to the compressor passage 22, and is discharged to the outside of the compressor housing 21.

The housing coupling part 5 is disposed between the compressor housing 21 and the turbine housing 11. The housing coupling part 5 couples the compressor housing 21 and the turbine housing 11. The housing coupling part 5 covers the rotating shaft 2 from the outer peripheral side. The housing coupling part 5 is provided with a bearing 6. The rotating shaft 2 is supported by the bearing 6 so as to become rotatable relative to the housing coupling part 5.

Figure 2:
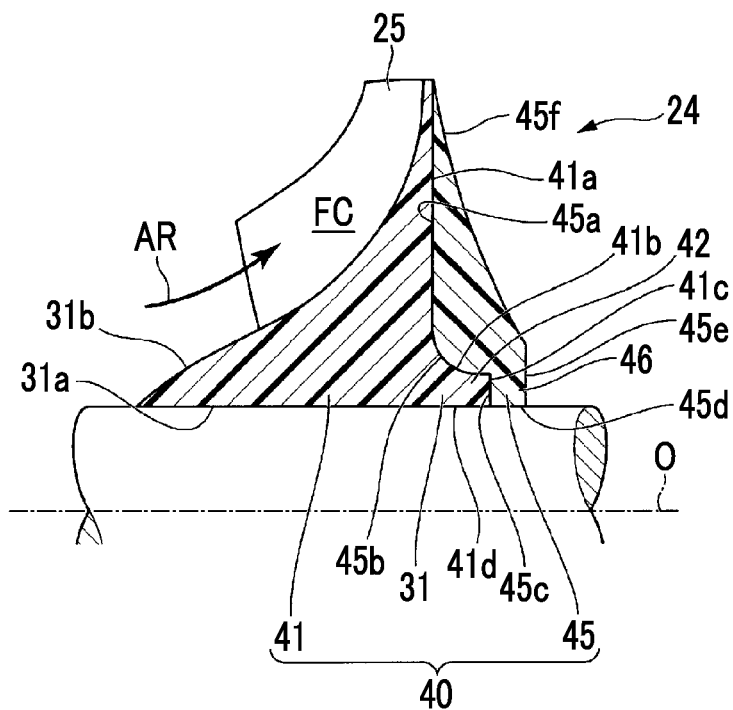
FIG. 2 is a longitudinal sectional view illustrating a compressor impeller of the turbocharger related to the first embodiment of the invention.

Next, the compressor impeller 24 will be described in detail with reference to FIG. 2.

The compressor impeller 24 includes a plurality of the compressor blades 25, and an impeller body 31 that supports the compressor blades 25 on a front surface side.

The plurality of compressor blades 25 are provided apart from each other in a radial direction, and are made of a resin to be described below. Additionally, a flow passage FC through which the air AR flows is formed between the compressor blades 25 that are adjacent to each other in a circumferential direction.

The impeller body 31 is a so-called hub that forms a disk-like shape and supports the compressor blades 25 on the front surface side, that is, the compressor blades 25 on the other side in the direction of the axis O. The impeller body 31 is made of a resin to be described below, similar to the compressor blades 25. A boss hole section 31a having the rotating shaft 2 inserted therethrough and fitted thereinto is formed in a region on a radial inner side in the impeller body 31. A surface that faces the front surface side (the other side in the direction of the axis O) of the impeller body 31 is a hub surface 31b that allows the compressor blades 25 to protrude to the front surface side therefrom.

The compressor blades 25 and the impeller body 31 form the compressor impeller 24 by a plurality of split resin members 40 being engaged with each other.

In the present embodiment, the resin members 40 include a first resin member 41 that includes the compressor blades 25 and the portion of the impeller body 31 on the front surface side and is formed of a complex material including a resin and reinforcing fibers, and a second resin member 45 that includes the portion of impeller body 31 on the back surface side and is formed of a complex material including a resin and reinforcing fibers.

The first resin member 41 has the hub surface 31b, a first back surface 41a that faces one side in the direction of the axis O by extending continuously with the hub surface 31b in the radial direction, and a first protruding surface 41b that extends to one side in the direction of the axis O so as to run in the direction of the axis O continuously with the first back surface 41a on the radial inner side.

The first resin member 41 has a first end surface 41c that faces one side in the direction of the axis O by extending in the radial direction continuously with the first protruding surface 41b, and a first inner peripheral surface 41d that become a portion of an inner peripheral surface of the boss hole section 31a, through which the rotating shaft 2 is inserted, continuously with the first end surface 41c.

A region surrounded by the first protruding surface 41b, the first end surface 41c, and the first inner peripheral surface 41d is formed as a first annular protruding part 42 that protrudes to one side in the direction of the axis O and forms an annular shaped about the axis O from a position on the radial inner side in the first back surface 41a.

The first protruding surface 41b is curved so as to be continuous smoothly from the first back surface 41a and so as to form a rounded shape that becomes concave toward the other side in the direction of the axis O and the radial inner side, at a portion connected with the first back surface 41a.

Here, as resins used for the first resin member 41. Polyether sulfone (PES), polyether imide (PEI), polyether ether ketone (PEEK), polyether ketone (PEK), polyether ketone ketone (PEKK) and poly ketone sulfide (PKS), polyaryl ether ketone (PAEK), aromatic polyamide (PA), polyamide imide (PAI), polyimide (PI), and the like are exemplified.

Additionally, as the reinforcing fibers used for the first resin member 41, carbon fibers, glass fibers, Whisker, and the like are exemplified.

The second resin member 45 has a front surface 45a that faces the first back surface 41a in the first resin member 41, a radial surface 45b that faces the first protruding surface 41b continuously with the front surface 45a, a second protruding surface 45c that faces the first end surface 41c continuously with the radial surface 45b, and a second inner peripheral surface 45d that forms the inner peripheral surface of the boss hole section 31a together with the first inner peripheral surface 41d continuously with the second protruding surface 45c.

The second resin member 45 has an axial surface 45e that extends in the radial direction continuously with the second inner peripheral surface 45d, and a second back surface 45f that extends in the radial direction continuously with the axial surface 45e.

The front surface 45a extends in the radial direction and faces the other side in the direction of the axis O.

The radial surface 45b extends so as to run in the direction of the axis O continuously with the front surface 45a, on the radial inner side of the front surface 45a. The radial surface 45b is curved so as to be continuous smoothly from the front surface 45a and so as to form a rounded shape that becomes convex toward the other side in the direction of the axis O and the radial inner side, at a portion connected with the front surface 45a.

The second protruding surface 45c extends from the radial surface 45b to the radial inner side in the radial direction.

The second inner peripheral surface 45d extends from the radial surface 45b to one side in the direction of the axis O along the axis O and becomes a portion of the inner peripheral surface of the boss hole section 31a through which the rotating shaft 2 is inserted.

The axial surface 45e extends from the second inner peripheral surface 45d to the radial outer side.

The second back surface 45f is inclined to the other side in the direction of the axis O as it becomes closer to the radial outer side from the axial surface 45e. The second back surface 45f is curved so as to become concave toward the other side in the direction of the axis O and the radial inner side. The second back surface 45f forms a back surface of the impeller body 31 together with the axial surface 45e.

Accordingly, a region surrounded by the second protruding surface 45c, the second inner peripheral surface 45d, and the axial surface 45e is formed as a second annular protruding part 46 that protrudes from the position of the radial surface 45b on one side in the direction of the axis O to the radial inner side and forms an annular shape about the axis O.

The second resin member 45 is formed of a complex material including the same resin and reinforcing fibers as those of the first resin member 41. The second resin member 45 is engaged with the first resin member 41 by an insert molding being used and provided for the first resin member 41.

According to the turbocharger 1 of the present embodiment described above, the compressor impeller 24 is constituted with the two resin members 40 of the first resin member 41 and the second resin member 45. For this reason, the thickness dimension of each member can be made small.

Here, the resin members 40 are molded using a mold. In this case, on the sides of the resin members contacting the mold, cooling proceeds rapidly compared to the insides of the resin members 40 spaced apart from the mold. Thus, film-like skin layers with a small thickness of about several millimeters from the surfaces of the resin members are formed. On the other hand, since cooling proceeds gently on the insides of the resin members 40, core layers are formed. The skin layers have high strength compared to the core layers.

In the present embodiment, since the thickness dimension of each resin member 40 becomes small as described above, the proportion of the skin layer in each resin member 40 can be enlarged. Therefore, the strength of the compressor impeller 24 can be improved. Moreover, since each resin member 40 becomes small, improvement in precision of molding and facilitation of molding can be achieved. Therefore, according to the structure having the plurality of split resin members 40 in this way, it is possible to effectively suppress deformation of the compressor impeller 24, and reliability can be guaranteed.

Here, in the present embodiment, the compressor impeller 24 is formed by the two resin members 40, but may be formed by much more resin members.

[Second Embodiment]

Figure 3:
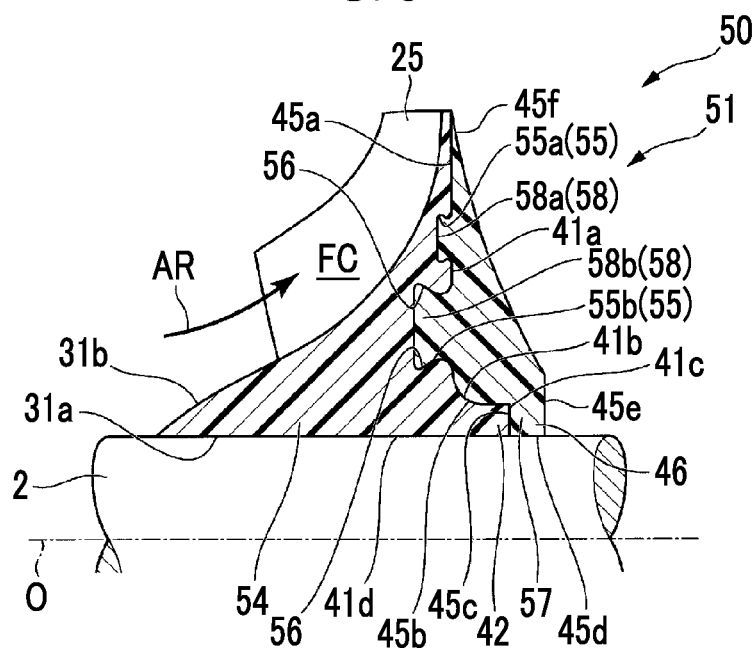
FIG. 3 is a longitudinal sectional view illustrating a compressor impeller of a turbocharger related to a second embodiment of the invention.

Next, a second embodiment of the invention will be described with reference to FIG. 3.

The same constituent elements as those of the first embodiment will be designated by the same reference signs, and the detailed description thereof will be omitted.

A turbocharger 50 of the present embodiment is different from the first embodiment in a first resin member 54 and a second resin member 57 in a compressor impeller 51.

The first resin member 54 includes the compressor blades 25 and the portion of the impeller body 31 on the front surface side, similar to the first embodiment. In the present embodiment, two recesses 55, which are recessed toward the other side in the direction of the axis O, are formed apart from each other in the radial direction in the first back surface 41a.

In the recesses 55, a first recess 55a that is located on the radial outer side is formed at a substantially central position in the radial direction in the first back surface 41a. The first recess 55a is a recessed groove that is formed in an annular shape about the axis O.

In the recesses 55, a second recess 55b that is located on the radial inner side is a recessed groove that is formed at a substantially central position in the radial direction between a position where the first recess 55a is formed, and a position where the first back surface 41a and the first protruding surface 41b are connected together, and that is formed in an annular shape about the axis O.

The second recess 55b is formed to be deeper in the direction of the axis O and larger in the radial direction than the first recess 55a. Additionally, a pair of inner surfaces 56 of the second recess 55b that faces the radial direction is curved surfaces that are gradually spaced apart from each other as it becomes closer to one side in the direction of the axis O and become convex in mutually approaching directions.

The second resin member 57 includes the portion of the impeller body 31 on the back surface side, similar to the first embodiment. In the present embodiment, two protrusions 58, which protrude toward the other side in the direction of the axis O, that is, toward the first resin member 54, are formed apart from each other in the radial direction in the front surface 45a.

In the protrusions 58, a first protrusion 58a that is located on the radial outer side is a protrusion that is formed at a substantially central position in the radial direction in the front surface 45a and is formed in annular shape about the axis O. The first protrusion 58a is fitted into the first recess 55a.

In the protrusions 58, a second protrusion 58b that is located on the radial inner side is a projection that is formed at a substantially central position in the radial direction between a position where the first protrusion 58a is formed, and a position where the front surface 45a and the radial surface 45b are connected together, and that is formed in an annular shape about the axis O.

The second protrusion 58b is formed to be higher in the direction of the axis O and larger in the radial direction than the first protrusion 58a. Additionally, a pair of outer surfaces 59 of the second protrusion 58b that faces the radial direction is curved surfaces that are gradually spaced apart from each other as it becomes closer to one side in the direction of the axis O and become concave in mutually approaching directions. The second protrusion 58b is fitted into the second recess 55b.

According to the turbocharger 50 of the present embodiment described above, the compressor impeller 51 consists of the first resin member 54 and the second resin member 57. Therefore, the thickness dimension of each member can be made small. For this reason, the ratios of the skin layers in the first resin member 54 and the second resin member 57 can be enlarged. Therefore, the strength of the compressor impeller 51 can be improved. Moreover, since the first resin member 54 and the second resin member 57 become small, improvement in precision of molding and facilitation of molding can be achieved.

Moreover, since the protrusions 58 and the recesses 55 are fitted to each other and the first resin member 54 and the second resin member 57 are engaged with each other, these members can be fixed firmly, and these members can be prevented from falling out during rotation.

Here, the recesses 55 and the protrusions 58 of the present embodiment may be formed three or more, respectively, or may be formed one, respectively, and the numbers of recesses and protrusions are not limited to the above-described case. Moreover, contrary to the above-described case, the protrusions 58 may be formed on the first resin member 54 and the recesses 55 may be formed in the second resin member 57, or both the recesses 55 and the protrusions 58 may be formed in both the first resin member 54 and the second resin member 57, respectively.

[Third Embodiment]

Figures 4A, 4B:
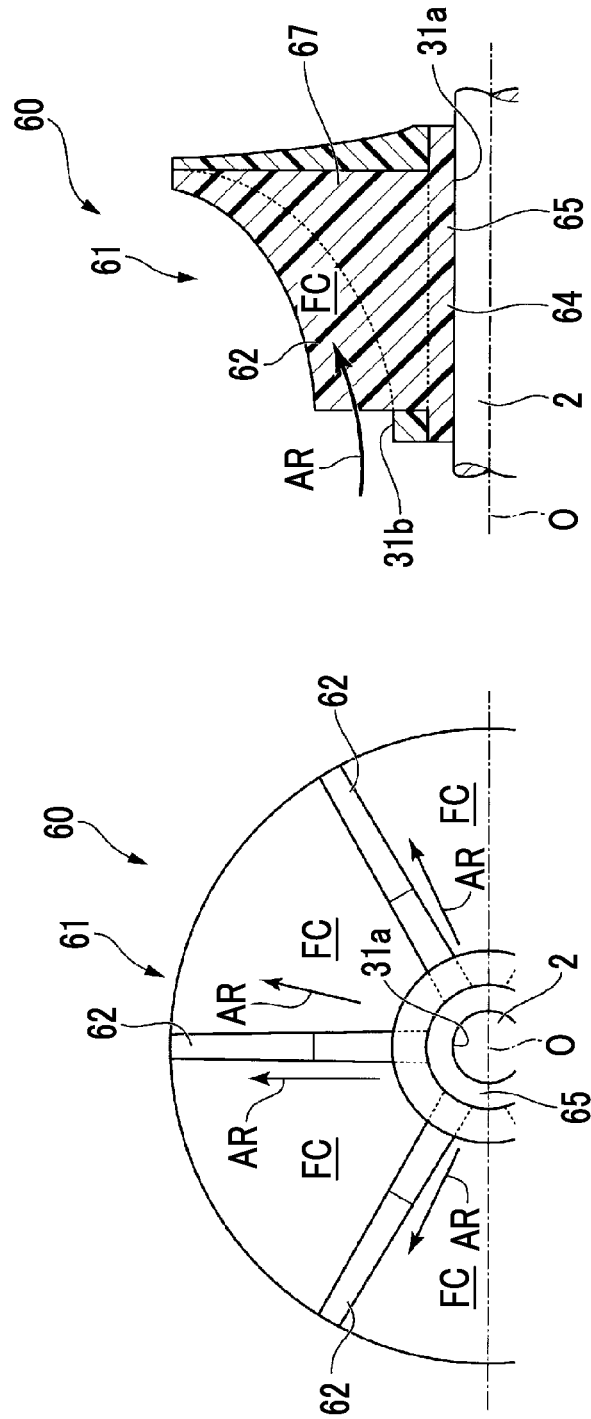
FIGS. 4A and 4B are longitudinal sectional views illustrating a compressor impeller of a turbocharger related to a third embodiment of the invention.

Next, a third embodiment of the invention will be described with reference to FIGS. 4A and 4B.

The same constituent elements as those of the first and second embodiments will be designated by the same reference signs, and the detailed description thereof will be omitted.

A turbocharger 60 of the present embodiment is different from the first and second embodiments in a first resin member 64 and a second resin member 67 in a compressor impeller 61.

The first resin member 64 includes a boss part 65 in which the compressor blades 62 and the boss hole section 31a are formed and from which the compressor blades 62 protrude to the radial outer side of the rotating shaft 2.

That is, the boss part 65 forms a tubular shape centered on the axis O. The compressor blades 62 are formed integrally with the boss part 65 so as to extend radially from an outer peripheral surface of the boss part 65 to the radial outer side.

The second resin member 67 includes the hub surface 31b that covers the boss part 65 from the outer peripheral side to allow the compressor blades 62 to protrude therefrom to the other side in the direction of the axis O that becomes the front surface side, in the impeller body 31, and a portion closer to the outer peripheral side than the boss part 65 except for the boss part 65. That is, the hub surface 31b is provided so as to allow the compressor blades 62 to pass therethrough.

The first resin member 64 is engaged with the second resin member 67 by an insert molding being used for the second resin member 67.

In the turbocharger 60 of the present embodiment described above, a centrifugal force acts on the compressor blades 62 particularly greatly due to the rotation of the compressor impeller 61. Here, in the present embodiment, the first resin member 64 includes the compressor blades 62 and the boss part 65.

Therefore, the boss part 65 can be formed in a thin tubular shape as a member different from the other portions of the impeller body 31. Additionally, the compressor blades 62 are also thin. For this reason, the proportion of the skin layer in the first resin member 64 can be enlarged, and the strength can be improved.

Additionally, since the second resin member 67 is provided to cover the boss part 65, a centrifugal force that has acted on each compressor blade 62 can be transmitted to the inside of the second resin member 67, that is, the second resin member 67 on the radial inner side closer to the rotating shaft 2, via the boss part 65. Therefore, the deformation of the first resin member 64 caused by the centrifugal force can be suppressed by the second resin member 67.

Here, in the present embodiment, the compressor impeller 61 may be including a metallic member in which the same portion is made of a metal, instead of the second resin member 67. In this case, the deformation of the first resin member 64 caused by the centrifugal force can be suppressed by the high-rigidity metallic member.

[Fourth Embodiment]

Next, a fourth embodiment of the invention will be described with reference to FIGS. 5A to 7.

The same constituent elements as those of the first to third embodiments will be designated by the same reference signs, and the detailed description thereof will be omitted.

A turbocharger 70 of the present embodiment is different from the first to third embodiments in a first resin member 74 and a second resin member 77 in a compressor impeller 71.

The first resin member 74 includes only compressor blades 72.

Each of the compressor blades 72 of the present embodiment has a base end part 72a that becomes an end part on the radial inner side, and a tip part 72b that extends from the base end part 72a to the radial outer side.

Figure 6:
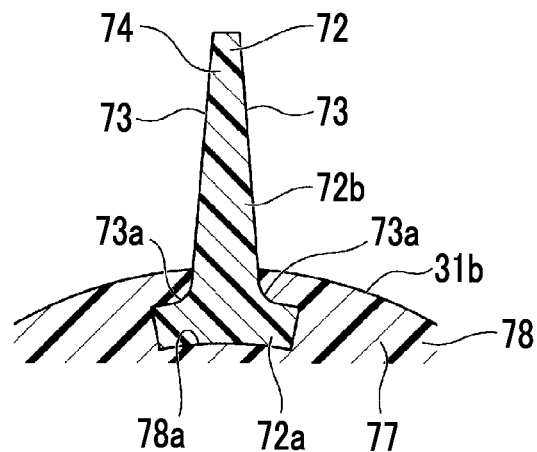
FIG. 6 is a sectional view orthogonal to an axis of a compressor blade of the turbocharger related to the fourth embodiment of the invention, and a sectional view illustrating an A-A section of FIG. 5B.

As illustrated in FIG. 6, the base end part 72a is curved such that the shape of a cross-section orthogonal to the axis O extends in the circumferential direction along the hub surface 31b.

The tip part 72b is formed integrally with the base end part 72a, and the width dimension thereof in the circumferential direction is smaller than the base end part 72a. Additionally, the width dimension of the tip part 72b in the circumferential direction becomes gradually small as it becomes closer to the radial outer side. A rounded surface part 73a, which is curved such that both side surfaces 73 in the tip part 72b that face the circumferential direction form a concave in mutually approaching directions, is provided at a position where the tip part 72b and the base end part 72a are connected together.

That is, the compressor blade 72 is of a so-called T route type.

The boss hole section 31a is formed in the second resin member 77. The second resin member 77 includes the hub surface 31b that covers the base end part 72a of the compressor blade 72 from the outer peripheral side and allows the tip part 72b to protrude therefrom to the front surface side. That is, the second resin member 77 includes a whole impeller body 78.

In the present embodiment, a groove part 78a into which the base end part 72a of the compressor blade 72 is fitted is formed in the impeller body 78. Namely, the groove part 78a is recessed from the hub surface 31b to the radial inner side and is formed along the hub surface 31b in the direction of the axis O. Additionally, a sectional shape of the groove part 78a is a T route type so as to correspond to the shape of the base end part 72a.

Here, the groove part 78a may be formed such that the base end part 72a is disposed closer to the inside of the impeller body 78 (second resin member 77) than a film-like skin layer formed in the hub surface 31b.

The first resin member 74 is engaged with the second resin member 77 by an insert molding being used for the second resin member 77.

According to the turbocharger 70 of the present embodiment described above, the first resin member 74 including only the compressor blades 72 and the second resin member 77 including the hub surface 31b are providing as separate members. Thus, the proportion of the skin layers in the first resin member 74 and the second resin member 77 can be enlarged, and the strength can be improved.

Additionally, the base end part 72a of each compressor blade 72 can be disposed closer to the inside of the second resin member 77, that is, on the radial inner side closer to the rotating shaft 2. Therefore, a centrifugal force that has acted on each compressor blade 72 can be transmitted from the base end part 72a to the second resin member 77 on a further inside of the second resin member 77, and the deformation the first resin member 74, that is, the compressor blade 72 caused by the centrifugal force can be suppressed by the second resin member 77.

Moreover, the base end part 72a of each compressor blade 72 can be disposed closer to the inside of the second resin member 77 than the skin layer formed on the hub surface 31b side of the second resin member 77, and it is possible to transmit the centrifugal force, which acts on the compressor blade 72, from the base end part 72a to the whole skin layer on the hub surface 31b side. Therefore, the deformation of the first resin member 74 caused by the centrifugal force can be suppressed by the second resin member 77.

Figure 7:
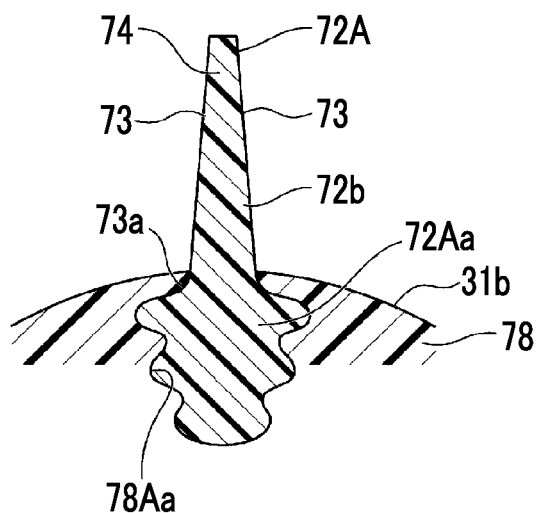
FIG. 7 is a sectional view orthogonal to the axis of the compressor blade of the turbocharger related to the modification example of the fourth embodiment of the invention, and illustrates a cross-section equivalent to the A-A section of FIG. 5B.

Here, as illustrated in FIG. 7, the sectional shape of a compressor blade 72A may have a so-called Christmas tree type base end part 72Aa. In this case, the sectional shape of a groove part 78Aa is similarly formed in a Christmas tree type such that the base end part 72Aa is fittable into the groove part.

In addition, the shapes of the base end parts 72a and 72Aa are not limited to the cases illustrated in FIG. 6 and FIG. 7, and various shapes can be selected if the base end parts have shapes fittable to the second resin member 77.

Additionally, in the present embodiment, the compressor impeller 71 may be including a metallic member in which the same portion is made of a metal, instead of the second resin member 77. In this case, the deformation of the first resin member 74 caused by the centrifugal force can be suppressed by the metallic member.

Although the embodiments of the invention have been described above in detail, some design changes can also be made without departing from the technical idea of the invention.

For example, the division positions of the respective resin members are not limited to the cases of the above-described embodiments, and may be changed appropriately.

Additionally, in the above-described embodiments, as the rotary machine, the turbocharger has been described as an example. However, the invention may be used for other centrifugal compressors and the like.

INDUSTRIAL APPLICABILITY

According to the above-described impeller and rotary machine, a structure split into a plurality of pieces is provided. Thus, even if resin materials are used, it is possible to guarantee reliability.

REFERENCE SIGNS LIST

1: TURBOCHARGER (ROTARY MACHINE)
2: ROTATING SHAFT
3: TURBINE
4: COMPRESSOR
5: HOUSING COUPLING PART
6: BEARING
11: TURBINE HOUSING
12: SCROLL PASSAGE
13: DISCHARGE PORT
14: TURBINE IMPELLER
15: TURBINE BLADE
21: COMPRESSOR HOUSING
22: COMPRESSOR PASSAGE
23: SUCTION PORT
24: COMPRESSOR IMPELLER

25: COMPRESSOR BLADE
31: IMPELLER BODY
31a: BOSS HOLE SECTION
31b: HUB SURFACE
40: RESIN MEMBER
41: FIRST RESIN MEMBER
41a: FIRST BACK SURFACE
41b: FIRST PROTRUDING SURFACE
41c: FIRST END SURFACE
41d: FIRST INNER PERIPHERAL SURFACE
42: FIRST ANNULAR PROTRUDING PART
45: SECOND RESIN MEMBER
45a: FRONT SURFACE
45b: RADIAL SURFACE
45c: SECOND PROTRUDING SURFACE
45d: SECOND INNER PERIPHERAL SURFACE
45e: AXIAL SURFACE
45f: SECOND BACK SURFACE
46: SECOND ANNULAR PROTRUDING PART
G: EXHAUST GAS
A: AIR
O: AXIS
FC: FLOW PASSAGE
50: TURBOCHARGER (ROTARY MACHINE)
51: COMPRESSOR IMPELLER
54: FIRST RESIN MEMBER
55: RECESS
55a: FIRST RECESS
55b: SECOND RECESS
56: INNER SURFACE
57: SECOND RESIN MEMBER
58: PROTRUSION
58a: FIRST PROTRUSION
58b: SECOND PROTRUSION
59: OUTER SURFACE
60: TURBOCHARGER (ROTARY MACHINE)
61: COMPRESSOR IMPELLER
62: COMPRESSOR BLADE
64: FIRST RESIN MEMBER
65: BOSS PART
67: SECOND RESIN MEMBER
70: TURBOCHARGER (ROTARY MACHINE)
71: COMPRESSOR IMPELLER
72, 72A: COMPRESSOR BLADE
72a, 72Aa: BASE END PART
72b: TIP PART
73: SIDE SURFACE
73a: ROUNDED SURFACE PART
74: FIRST RESIN MEMBER
77: SECOND RESIN MEMBER
78: IMPELLER BODY
78a, 78Aa: GROOVE PART

The invention claimed is:

1. An impeller comprising:
an impeller body forming a disk-like shape and having a boss hole section formed therein, a rotating shaft being fitted into the boss hole section; and
a plurality of blades provided on a front surface side of the impeller body so as to protrude from a hub surface of the impeller body,
wherein the impeller is formed of a plurality of resin members, which are engaged with each other and made of a resin,
wherein the plurality of blades is formed only on one of the plurality of resin members,
wherein the plurality of resin members includes
a first resin member including the blades, and
a second resin member including the hub surface that has the boss hole section formed therein, the second resin member covering a base end part of each of the blades from an outer peripheral side, and allowing each of the blades to penetrate the second resin member from an inner peripheral surface of the boss hole section to the hub surface and to protrude from the hub surface in a radial direction of the rotating shaft.

2. An impeller comprising:
an impeller body forming a disk-like shape and having a boss hole section formed therein, a rotating shaft being fitted into the boss hole section;
a plurality of blades provided on a front surface side of the impeller body so as to protrude from a hub surface of the impeller body;
a resin member including a boss part that has the blades and the boss hole section formed therein, forms a tubular shape, and allows the blades to protrude therefrom to a radial outer side of the rotating shaft; and
a metallic member including the hub surface that is disposed closer to an outer peripheral side than the boss part, is engaged with and covers the resin member from an outer peripheral side of the resin member, and allows the blades to penetrate the metallic member from an inner peripheral surface facing the rotating shaft to the hub surface and to protrude from the hub surface in a radial direction of the rotating shaft.

3. An impeller comprising:
an impeller body forming a disk-like shape and having a boss hole section formed therein, a rotating shaft being fitted into the boss hole section;
a plurality of blades provided on a front surface side of the impeller body so as to protrude from a hub surface of the impeller body;
a resin member including the blades; and
a metallic member including the hub surface that is engaged with the resin member, the metallic member having the boss hole section formed therein, and a plurality of grooves formed in the hub surface, each groove receiving a base end part of each of the blades, and allowing a tip part of the blade to protrude therefrom to the front surface side,
wherein each of the plurality of blades has a tip part and a base end part having a width, in a radial direction of the rotating shaft, larger than the tip part, and
wherein each of the plurality of grooves includes an opening, defined by the hub surface, for receiving the tip part and an increased width portion for receiving the base end part.

4. A rotary machine comprising:
the impeller according to claim 1; and
a rotating shaft that is attached to the impeller and rotates together with the impeller.

5. A rotary machine comprising:
the impeller according to claim 2; and
a rotating shaft that is attached to the impeller and rotates together with the impeller.

6. A rotary machine comprising:
the impeller according to claim 3; and a rotating shaft that is attached to the impeller and rotates together with the impeller.

* * * * *